United States Patent
Manuel et al.

(10) Patent No.: US 11,712,869 B2
(45) Date of Patent: Aug. 1, 2023

(54) MULTILAYERED MAT

(71) Applicant: Newpark Mats & Integrated Services LLC, The Woodlands, TX (US)

(72) Inventors: Dane Manuel, Youngsville, LA (US); Jingxing Feng, Neenah, WI (US); Gaurav Agrawal, Katy, TX (US)

(73) Assignee: NEWPARK MATS & INTEGRATED SERVICES LLC, The Woodlands, TX (US)

( * ) Notice: Subject to any disclaimer, the term of this patent is extended or adjusted under 35 U.S.C. 154(b) by 142 days.

(21) Appl. No.: 17/004,673

(22) Filed: Aug. 27, 2020

(65) Prior Publication Data
US 2022/0063232 A1    Mar. 3, 2022

(51) Int. Cl.
| | |
|---|---|
| *B32B 3/10* | (2006.01) |
| *B32B 3/06* | (2006.01) |
| *B29C 43/10* | (2006.01) |
| *B32B 3/30* | (2006.01) |
| *B32B 7/022* | (2019.01) |
| *B32B 5/14* | (2006.01) |

(52) U.S. Cl.
CPC ............... *B32B 3/06* (2013.01); *B29C 43/10* (2013.01); *B32B 3/30* (2013.01); *B32B 5/142* (2013.01); *B32B 7/022* (2019.01); *B32B 2419/04* (2013.01); *B32B 2471/04* (2013.01)

(58) Field of Classification Search
None
See application file for complete search history.

(56) References Cited

U.S. PATENT DOCUMENTS

| | | | |
|---|---|---|---|
| 6,649,110 B1 | 11/2003 | Seaux et al. | |
| 10,156,045 B2 | 12/2018 | Penland et al. | |
| 2007/0042828 A1* | 2/2007 | Krushke | ............... E04F 15/107 472/92 |

(Continued)

FOREIGN PATENT DOCUMENTS

| | | |
|---|---|---|
| GB | 1221354 A | 2/1971 |
| GB | 2000726 A | 1/1979 |

(Continued)

OTHER PUBLICATIONS

International Search Report, International Application No. PCT/US2021/047480, dated Nov. 25, 2021, Russian Federal Institute of Industrial Property; International Search Report 4 pages.

(Continued)

*Primary Examiner* — Christopher M Polley
(74) *Attorney, Agent, or Firm* — Cantor Colburn LLP

(57) ABSTRACT

Mats and panels of mats and methods of making the same are described. The panels include a first portion defined by a first material and a second portion defined by a second material. The first material and the second material have at least one of different compositions and different material properties. The methods include depositing a first material into a mold of a panel, depositing a second material into the mold of the panel after deposition of the first material, and applying at least one of pressure and heat to the mold of the panel to form a panel having the first material and the second material having at least one different compositions and different material properties.

20 Claims, 8 Drawing Sheets

(56) References Cited

U.S. PATENT DOCUMENTS

2009/0016817 A1\* 1/2009 Kulhawe .............. E04F 15/105
404/38

FOREIGN PATENT DOCUMENTS

| JP | 2007275521 A | 10/2007 |
|----|--------------|---------|
| JP | 2007284953 A | 11/2007 |
| WO | 2007002442 A1 | 1/2007 |

OTHER PUBLICATIONS

International Written Opinion, International Application No. PCT/US2021/047480, dated Nov. 25, 2021, Russian Federal Institute of Industrial Property; International Written Opinion 5 pages.

\* cited by examiner

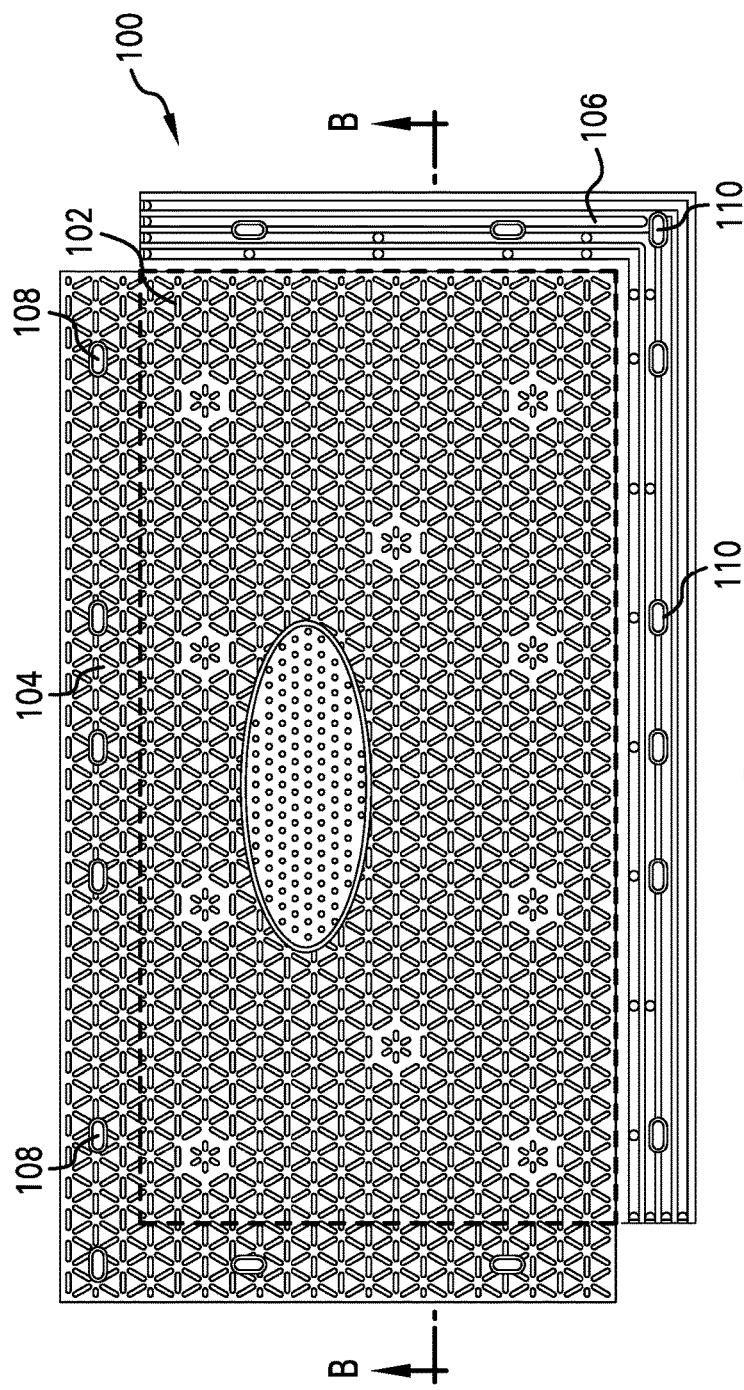
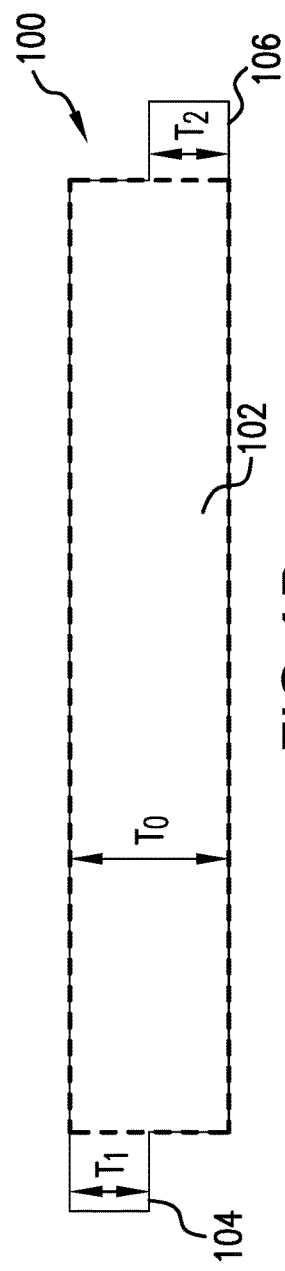
FIG. 1A
FIG. 1B

MULTILAYERED MAT

BACKGROUND

When performing operations with heavy equipment it may be useful to provide a firm, stable, and continuous support surface to support such heavy equipment or otherwise provide for a stable work surface and/or a support surface over which vehicles may be conveyed. Such support surfaces can provide support for the equipment, vehicles, and personnel involved in work processes and may be configured to withstand severe weather and other harsh environmental impacts. The components of the support surface may be capable of being quickly and easily installed and capable of being easily removed and reused.

Wooden boards or planks have historically been used to construct temporary roadways and equipment support surfaces in remote or undeveloped areas where the terrain lacks sufficient integrity to adequately support trucks and other heavy equipment. Such boards were generally placed end to end, or side by side, to form a continuous load supporting surface. While individual wooden boards or planks have been used to construct support surfaces for some time, this method of building roadways and other load bearing surfaces suffers from some very significant disadvantages.

A variety of mat systems have been developed for the construction of temporary roadways and support surfaces. These mat systems typically utilize prefabricated, multi-layered mats which can be installed in a variety of configurations to create roadways or other support surfaces. These mats, which are constructed of a number of individual boards or planks affixed together in a variety of configurations, generally interconnect or inter mesh with one another to form a continuous, or nearly continuous, support surface. It may be advantageous to have improved mats and systems for providing and creating temporary roadways and/or support surfaces.

SUMMARY

According to some embodiments, panels of mats are provided. The panels include a first portion defined by a first material and a second portion defined by a second material. The first material and the second material have at least one of different compositions and different material properties.

In addition to one or more of the features described above, or as an alternative, embodiments of the panels may include that the first material is different from the second material in at least two of density, flexibility, stiffness, rigidity, antiskid, antistatic, conductivity, resilience, chemical resistance, and permeability properties.

In addition to one or more of the features described above, or as an alternative, embodiments of the panels may include that the first portion is a first layer and the second portion is a second layer adjacent to the first layer.

In addition to one or more of the features described above, or as an alternative, embodiments of the panels may include that the first portion defines a top surface of the panel and the second portion defines a bottom surface of the panel.

In addition to one or more of the features described above, or as an alternative, embodiments of the panels may include that the first portion extends from a bottom surface to a top surface of the panel and the second portion extends from the bottom surface to the top surface of the panel, wherein the first portion is adjacent the second portion.

In addition to one or more of the features described above, or as an alternative, embodiments of the panels may include that the first portion defines a main body of the panel and the second portion defines a lip structure of the panel.

In addition to one or more of the features described above, or as an alternative, embodiments of the panels may include a third portion arranged such that the second portion is positioned at least partially between opposite the first portion and the third portion.

In addition to one or more of the features described above, or as an alternative, embodiments of the panels may include that the third portion is formed by the first material.

In addition to one or more of the features described above, or as an alternative, embodiments of the panels may include that at least the first portion defines interior structures of the panel.

According to some embodiments, mats are provided. The mats include a first panel and a second panel bonded to the first panel. The first panel includes a respective first portion defined by a respective first material and a respective second portion defined by a respective second material. The respective first material and the respective second material have at least one different compositions and different material properties.

In addition to one or more of the features described above, or as an alternative, embodiments of the mats may include that the second panel include a respective first portion defined by a respective first material and a respective second portion defined by a respective second material. The respective first material of the second panel and the respective second material of the second panel have at least one different compositions and different material properties.

In addition to one or more of the features described above, or as an alternative, embodiments of the mats may include that the second panel is formed from a single material.

According to some embodiments, methods of manufacturing panels or mats are provided. The methods include depositing a first material into a mold of a panel, depositing a second material into the mold of the panel after deposition of the first material, and applying at least one of pressure and heat to the mold of the panel to form a panel having the first material and the second material having at least one different compositions and different material properties.

In addition to one or more of the features described above, or as an alternative, embodiments of the methods may include that the first material is deposited from a first hopper that is moveable relative to the mold of the panel and the second material is deposited from a second hopper that is stationary and the mold of the panel is moved relative to the second hopper.

In addition to one or more of the features described above, or as an alternative, embodiments of the methods may include that the first material is deposited to define a first portion of a formed panel and the second material is deposited to form a second portion of the formed panel.

In addition to one or more of the features described above, or as an alternative, embodiments of the methods may include that each of the first material and the second material are deposited in solid pellet or granule form.

In addition to one or more of the features described above, or as an alternative, embodiments of the methods may include depositing a third material into the mold of the panel, wherein the first material is deposited in a first layer, the second material is deposited in a second layer over the first layer, and the third material is deposited in a third layer over the second layer.

In addition to one or more of the features described above, or as an alternative, embodiments of the methods may include depositing a third material into the mold of the panel, wherein the first material is deposited in a first region to define a first portion of the formed panel, the second material is deposited in a second region to define a second portion of the formed panel, and the third material is deposited in a third region to define a third portion of the formed panel.

In addition to one or more of the features described above, or as an alternative, embodiments of the methods may include that each of the first portion, the second portion, and the third portion are adjacent to each other.

In addition to one or more of the features described above, or as an alternative, embodiments of the methods may include that the mat is made of a single panel.

According to some embodiments, methods of manufacturing mats are provided. The method includes depositing a first material into a mold of a panel, depositing a second material into the mold of the panel after deposition of the first material, applying at least one of pressure and heat to the mold of the panel to form a first panel having the first material and the second material having at least one different compositions and different material properties, and joining the first panel with a second panel to form the mat.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure, are apparent from the following detailed description taken in conjunction with the accompanying drawings in which like elements may be numbered alike and:

FIG. 1A is a schematic illustration of a mat that may incorporate embodiments of the present disclosure;

FIG. 1B is a cross-sectional illustration of the mat of FIG. 1A as viewed along the line B-B of FIG. 1A;

DETAILED DESCRIPTION

Figure 2:
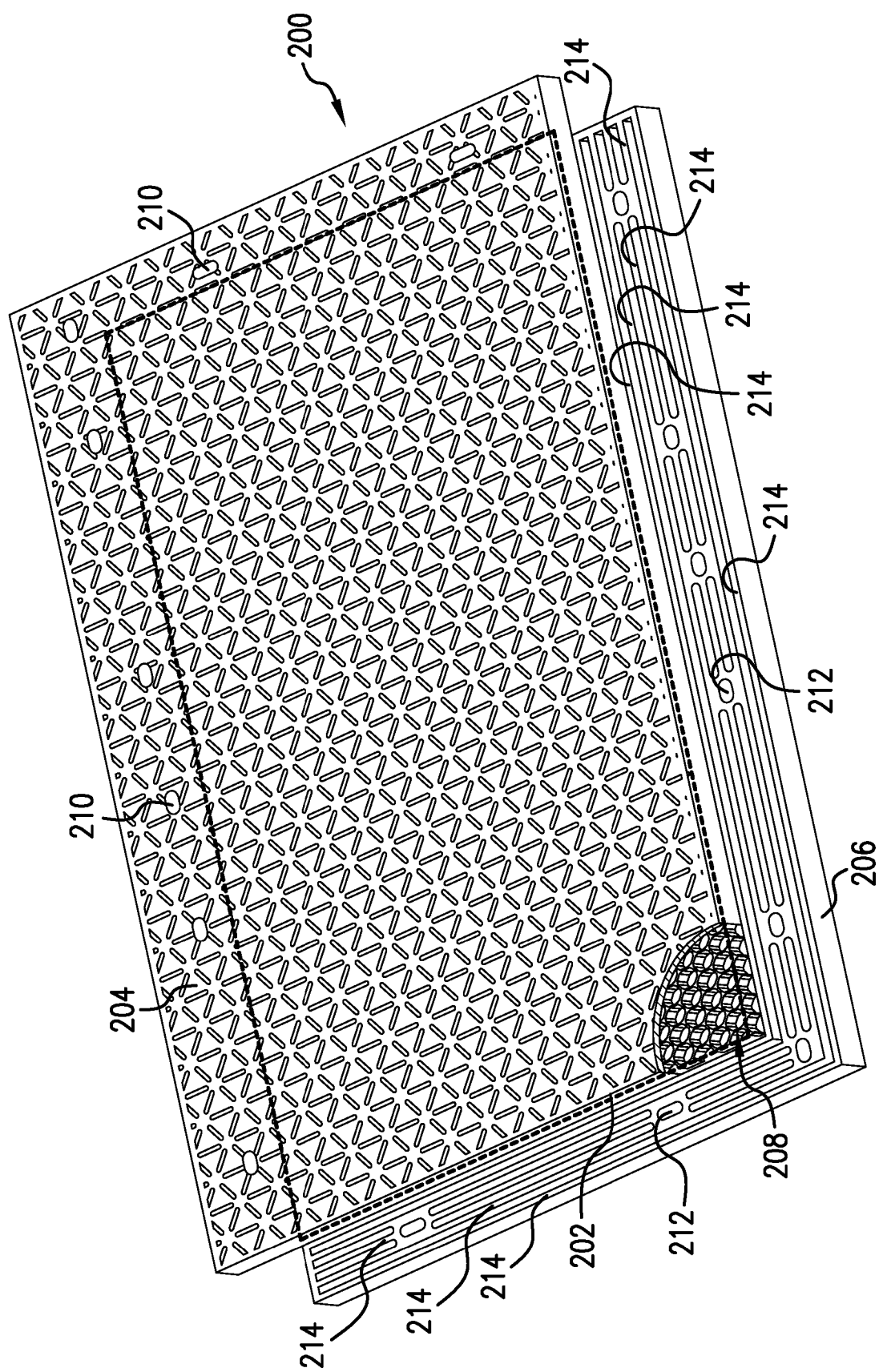
FIG. 2 an isometric illustration of a mat that may incorporate embodiments of the present disclosure, with a partial cutaway illustrating an interior structure of the mat.

Characteristics and advantages of the present disclosure and additional features and benefits will be readily apparent to those skilled in the art upon consideration of the following detailed description and accompanying figures. It should be understood that the description herein and associated drawings, being of example embodiments, are not intended to limit the claims of this patent or any patent or patent application claiming priority hereto. On the contrary, the intention is to cover all modifications, equivalents, and/or alternatives as appreciated by those of skill in the art. Many changes may be made to the particular embodiments and details disclosed herein without departing from the scope of the present disclosure.

Referring to FIGS. 1A-1B, schematic illustrations of a mat 100 that can incorporate embodiments of the present disclosure are shown. The mat 100 is configured to be a stand-alone structure or may be joined with one or more additional similar mats to define a support surface of a desired shape and/or size. The mat 100 is configured to provide a work or support surface over which vehicles may traverse, equipment may be installed and operated, etc. FIG. 1A illustrates a top-down plan view illustration of the mat 100 and FIG. 1B is a cross-sectional illustration of the mat 100 as viewed along the line B-B in FIG. 1A. The mat 100 can include a main body 102, a first lip structure 104, and a second lip structure 106. As shown, the main body 102 has a main body thickness $T_0$, and each lip structure 104, 106 has a respective lip structure thickness $T_1$, $T_2$. Because the mat 100 is configured to be joinable with other similar mats, the sum of the lip structure thicknesses $T_1$, $T_2$ can equal the main body thickness $T_0$. In an embodiment, the lip structure thicknesses $T_1$, $T_2$ can each be equal to half the main body thickness $T_0$.

The lip structures 104, 106 each extend outward from the main body 102. In one or more embodiments, each of the lip structures 104, 106 may extend from about half of a perimeter of the main body 102. The lip structures 104, 106 each include, as shown, respective pin apertures 108, 110 that are configured to receive a locking pin (not shown) to join two mats that are arranged adjacent to each other with pin apertures aligned. Such locking pins can be used to ensure a secure and continuous surface defined by the joined mats. That is, if two mats similar to that shown in FIGS. 1A-1B are joined by one or more locking pins installed through aligned pin apertures 108, 110, a first lip structure 104 on one mat 100 may overlap a second lip structure 106 of the adjacent mat, with the joined first and second lip structures of the two mats having a thickness equal to the main body thickness $T_0$.

Although shown and described as distinct components or features, the main body 102, the first lip structure 104, and the second lip structure 106 may be formed of a single continuous material (e.g., a uniform body), from two panels or portions joined together, or from three or more joined panels of portions. As a non-limiting example, the lip structures 104, 106 can be separately attached to, bonded to, or otherwise secured to the main body 102. As another example, the main body 102 can be formed from two panels, each having one of the lip structures 104, 106, and the two panels can be attached, bonded, or otherwise secured together. Accordingly, the illustrative configuration shown and described with respect to FIGS. 1A-1B is not intended to be limiting, but rather is provided for illustrative and explanatory purposes only.

Turning now to FIG. 2, a schematic illustration of a mat 200 that may incorporate embodiments of the present disclosure is shown. The mat 200 may have a similar construction as that shown and described with respect to the mat 100 in FIGS. 1A-1B. For example, the mat 200 may be made from a rigid material capable of withstanding compression forces, such as weights or other loads, positioned on the mat 200. For example, the mat 200 may be constructed of a thermoplastic polymeric material, such as polyethylene or alkathene. In one or more embodiments, the mat 200 can be made of high-density polyethylene, medium-density polyethylene, low-density polyethylene, or mixtures thereof.

The mat 200 includes a main body 202, a first lip structure 204, and a second lip structure 206, with the first and second lip structures 204, 206 extending from the main body 202 as illustrated above. As described above, the first and second lip structures 204, 206 extend or cantilever from portions of the exterior surfaces of the main body 202. The lip structures 204, 206 each include respective pin apertures 210, 212 to enable connection to and joining of two adjacent mats. The lip structures 204, 206 may also include respective rib structures 214 (only shown for the second lip structure 206 in this illustration) which may be aligned (e.g., top to bottom) or misaligned with a similar ribbed structure of an adjacent mat when two mats are arranged adjacent to each other and connected by locking pins.

The main body 202 includes an interior support structure 208. The interior support structure 208 is configured to provide strength to the mat 200, such as crush strength. The interior support structure 208 may be a combination of voids and ribs that are encapsulated by exterior surfaces of the main body 202. Thus, the interior support structure 208 can permit a reduction in weight as compared to a solid body structured mat.

The interior support structure 208 of the main body 202, may be, in some configurations, an interconnected web structure such as in a honeycomb or other geometric pattern, which may be a repeating pattern of the same geometric shape. As noted, the interior support structure 208 defines voids within the main body 202.

For example, in one non-limiting example, the voids of the interior support structure 208 may define at least 30% of the interior volume of the main body 202 (i.e., the main body 202 is 30% internally hollow in this example). The size and shape of the repeating pattern of the interconnected web structure can be changed or modified to change the number of voids in the main body 202. For example, the voids may define at least 45%, at least 50%, at least 60%, at least 70%, and/or other amount of the interior volume of the mat 200 that will be appreciated by those having ordinary skill in the art, depending on the application and use of the mat 200. In configurations where the interior support structure 208 is a geometric repeating pattern, each void of the interior support structure 208 may be between and inclusive of about 2.5 inches (6.35-cm) and about 5 inches (12.7-cm) in the largest dimension thereof.

Mats are conventionally made through a manufacturing process of pouring or otherwise depositing a material (e.g., beads of material) into a mold, and then applying heat and pressure to form the mat from the poured material. One such manufacturing process is described in U.S. Pat. No. 6,649,110, entitled "Method for manufacturing molded panels," which is hereby incorporated by reference in its entirety. The poured material may be a resin in melted or liquid state, or in a solid pellet or granule form.

Embodiments of the present disclosure are directed to improving overall properties of mats by altering the composition thereof and thereby improving use for particular utilities and/or applications. For example, in accordance with a non-limiting example, by constructing the mat or panels of the mat with a plurality of portions or layers of material with at least differing material properties, an improved mat may be constructed. It is disclosed herein that various portions or layers of individual panels may have distinct material properties and/or materials in each of a plurality of layers and/or in regions of a particular layer. The panel portions can be constructed of different materials, material compositions, or formed using different treatment processes to achieve different material properties. For example, in accordance with some embodiments of the present disclosure, panels of mats may be constructed to exhibit certain properties so that as a whole can have certain desired overall properties. Adjustable or selectable properties of the panels can include, but are not limited to, density, flexibility, stiffness, rigidity, antiskid, antistatic, conductivity, resilience, chemical resistance, and permeability.

The properties desired for the panel portions, in accordance with embodiments of the present disclosure, can be achieved in a number of ways as described herein. One way to adjust properties in a portion of a panel for a mat is to adjust the chemical composition of the material ("material") used in a given portion or layer versus another portion or layer. For example, in an embodiment having different materials, a first portion may be constructed of a material having a first chemical composition while a second portion can be constructed of a material having an entirely different chemical composition. The resulting portions will have different properties due to the compositional difference in the materials employed to create the respective portions.

Another way to adjust a property of a portion of a panel is to adjust merely a property of the same material in the layer ("material property") where the chemical composition of the material is the same as in another portion. For example, and using density as the material property to be adjusted, two portions may be constructed with a different amount of air trapped within a matrix of the material where the composition of that material is unchanged among the layers. Specifically, if a feedstock of polyethylene ("PE") material is fully melted and homogenized, a particular density will be achieved in a layer comprising that material upon solidifying. Differently, if the very same feedstock of PE material is only partially melted and fused, creating a portion comprising latticework type of structure, then the density of that portion would be substantially lower than the density of the fully melted and homogenized portion even though the exact same chemical composition is used in both portions. The material properties are thus distinct and will alter the overall properties of the panel made therefrom. It is further to be appreciated that the described methods for adjusting properties may be combined with each other or combined with different methods of adjusting properties and remain within the scope of the present disclosure.

Figure 3:
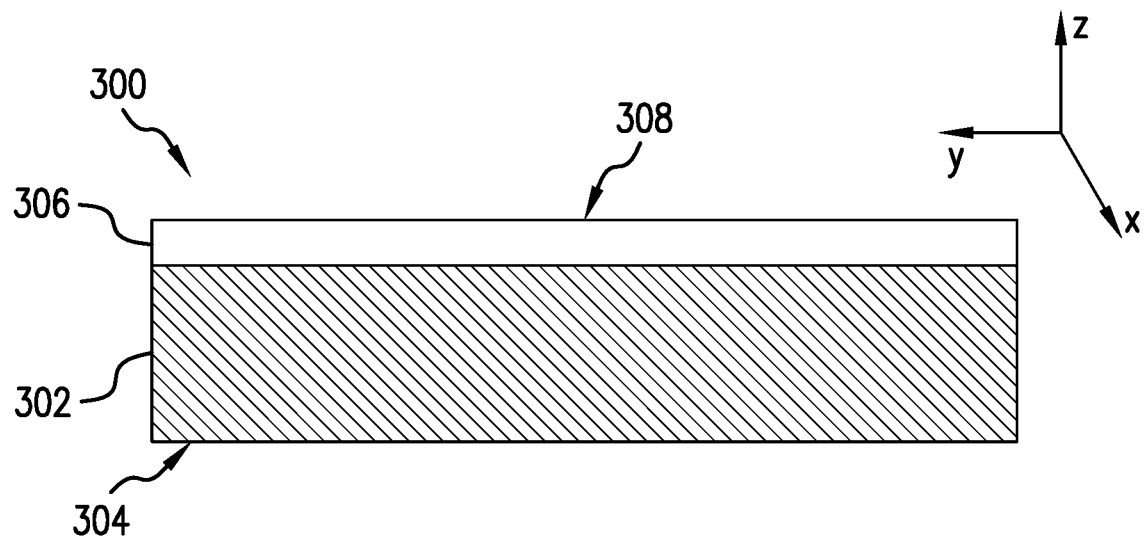
FIG. 3 is a side sectional view of a panel of a mat in accordance with an embodiment of the present disclosure.

For example, referring to FIG. 3, a schematic cross-sectional view of a panel 300 in accordance with an embodiment of the present disclosure is shown. Although illustrated and referred to as a single panel, those of skill in the art will appreciate that the illustration of FIG. 3 may be representative of a panel, a portion of a panel, a mat, a portion of a mat, or other similar structures. The panel 300 may be manufactured and designed to be joined with another panel (similar or different) to form a mat, such as, for example, shown and described above. The panel 300 in this embodiment is formed of or comprises two portions (e.g., layers) stacked on top of each other. A first portion 302 defines a first surface 304 (e.g., a bottom surface) and a second portion 306 defines a second surface 308 (e.g., a top surface). The first portion 302 may be a layer formed with internal structures, such as defining an interior support structure of the panel 300. Such interior support structure may be a honeycomb or other geometric pattern, which may be a repeating pattern of the same or similar geometric shapes. In this illustration, each portion 302, 306 is formed substantially planar in the x-y plane, and the second portion 306 is stacked on the first portion 302 in the z-direction.

The first portion 302 may be formed from a first material and the second portion 306 may be formed from a second material that is different from the first material. In some embodiments, the two materials may be similar compositions with some differences of material selection (e.g., percentage mix of materials) to achieve a different material property for each portion. That is, the first portion 302 and the second portion 306 may be formed from different respective materials to achieve a formed panel 300 having sections of different material properties. In some embodiments, the material of the second portion 306 may be selected to be a high-wear material such that a skin or surface layer of the panel 300 has a high wear-resistance. In contrast, the material of the first portion 302 may be selected for properties related to compression strength and/or flexibility.

It will be appreciated that the portions (in the form of layers) may be adjusted in material thickness, thus enabling different quantities of a given material or material property to be present within a given panel. As such, any number of portions, and any desired thickness thereof, may be employed without departing from the scope of the present disclosure.

Figure 4:
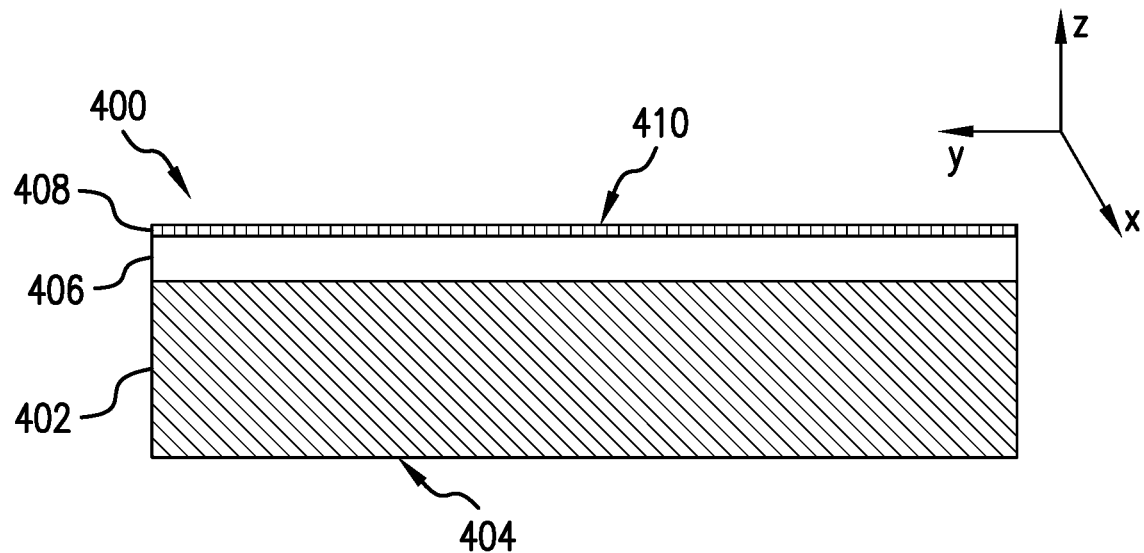
FIG. 4 is a side sectional view of a panel of a mat in accordance with an embodiment of the present disclosure.

Referring to FIG. 4, a schematic cross-sectional view of a panel 400 in accordance with an embodiment of the present disclosure is shown. Although illustrated and referred to as a single panel, those of skill in the art will appreciate that the illustration of FIG. 4 may be representative of a panel, a portion of a panel, a mat, a portion of a mat, or other similar structures. The panel 400 comprises three portions stacked on top of each other. A first portion 402 defines a first surface 404 (e.g., a bottom surface), a second portion 406 is stacked on the first portion 402, and a third portion 408 is stacked on the second portion 406 and defines a second surface 410 (e.g., a top surface). Similar to the embodiment of FIG. 3, the portions 402, 406, 408 are substantially planar in the x-y plane and stacked in the z-direction.

The first portion 402 may be a layer formed with internal structures, such as defining an interior support structure of the panel 400. The first portion 402 may be formed from a first material, the second portion 406 may be formed from a second material, and the third portion 408 may be formed from a third material. In some embodiments, each material of each respective portion 402, 406, 408 is different. However, in some embodiments, for example, the first and third portions 402, 408 may be formed of the same material and the intermediate second portion 406 may be formed from a material different from the first and third portions 402, 408. The selection of material or material composition may be made based on desired structural, wear, or other considerations. For example, one portion may be formed from a material selected to provide compression resistance, another portion may be formed from a material selected for flexibility, and another portion may be selected for wear resistance, gripping/frictional properties, etc.

Figure 5:
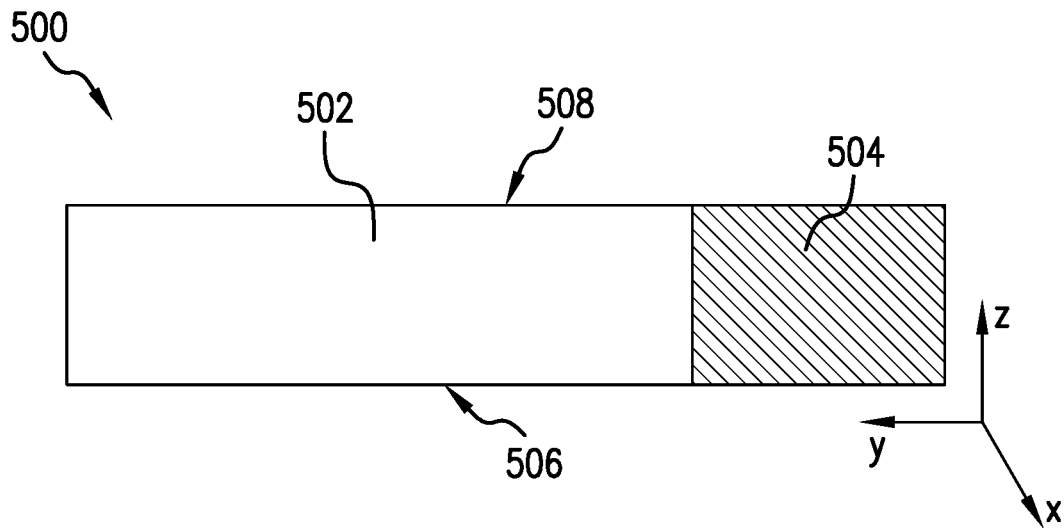
FIG. 5 is a side sectional view of a panel of a mat in accordance with an embodiment of the present disclosure.

FIGS. 3-4 illustrate vertical stacking of planar layers to form a structure. In some embodiments, in combination or alternatively, the stacking or arrangement of the portions may be horizontal, such that one portions is arranged adjacent another portion. For example, turning now to FIG. 5, a schematic cross-sectional view of a structure 500 in accordance with an embodiment of the present disclosure is shown. The structure 500 may be a panel, a portion of a panel, a mat, a portion of a mat, or other similar type structures, as will be appreciated by those of skill in the art. The structure 500 comprises two portions stacked next to each other. A first portion 502 is arranged next to a second portion 504. In this embodiment, each of the first portion 502 and the second portion 504 define part of a first surface 506 (e.g., a bottom surface) and part of a second surface 508 (e.g., a top surface). In this case, each portion 502, 504 spans from the first surface 506 to the second surface 508 in the z-direction and the "stacking" is (as shown) in the y-direction, although it could also be (or alternatively) in the x-direction.

The first portion 502 may be a layer formed with internal structures, such as defining an interior support structure of the structure 500. The first portion 502 may be formed from a first material and the second portion 504 may be formed from a second material different from the first material. The selection of material or material composition may be made based on desired structural, wear, or other considerations. For example, the first portion may be selected from a material having a high resistance to compression or crush whereas the second portion may be formed from a material selected to provide flexibility at edges of a formed mat (e.g., a lip structure).

Figure 6:
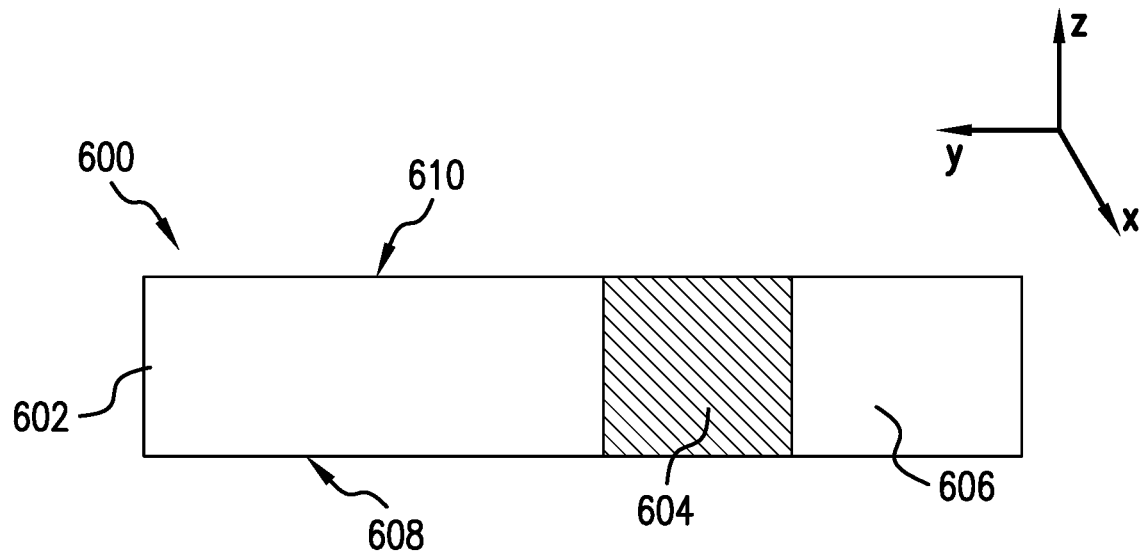
FIG. 6 is a side sectional view of a panel of a mat in accordance with an embodiment of the present disclosure.

Referring to FIG. 6, a schematic cross-sectional view of a structure 600 in accordance with an embodiment of the present disclosure is shown. The structure 600 may be a panel, a portion of a panel, a mat, a portion of a mat, or other similar type structures, as will be appreciated by those of skill in the art. The structure 600 comprises three portions arranged next to each other. A first portion 602, a second portion 604 arranged next to and adjacent to the first portion 602, and a third portion 606 arranged next to and adjacent to the second portion 604. Each of the three portions 602, 604, 606 define part of a first surface 608 (e.g., a bottom surface) and part of a second surface 610 (e.g., top surface). Each portion 602, 604, 606 may be formed from a specific material to provide specific material properties to the individual portions. In some embodiments, the first portion 602 and the third portion 606 may be formed from the same material and the second, intermediate, portion 604 may be formed from a different material or material having different material properties.

It will be appreciated that the portions (in the form of adjacent portions) may be adjusted in material width (and/or thickness), thus enabling different quantities of a given material or material property to be present within a given panel. As such, any number of portions, and any desired thickness thereof, may be employed without departing from the scope of the present disclosure. Further, specific designated portions are not limited to the lip structure having a different composition than the main body, but rather any given section or portion of a panel may have a composition specifically selected for the particular area or region of the panel.

In each of the embodiments illustratively shown in FIGS. 3-6, an individual panel of a mat is shown. The panels may be joined with other similar panels or a different composition panel to form a mat. In each case, the different materials of the portions of the panels may be deposited into a mold for forming a panel having a specific, pre-determined structure. With the material deposited into the mold, the entire panel can be compressed and heated to cause the materials to melt and bond together into a single panel structure.

Figure 7A:
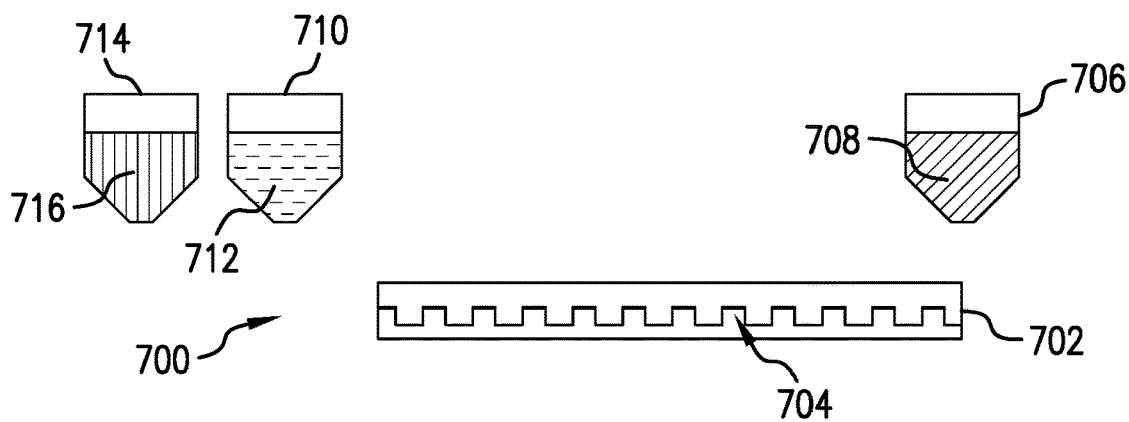
FIG. 7A is a schematic illustration of a step of a panel manufacturing process in accordance with an embodiment of the present disclosure.
Figure 7B:
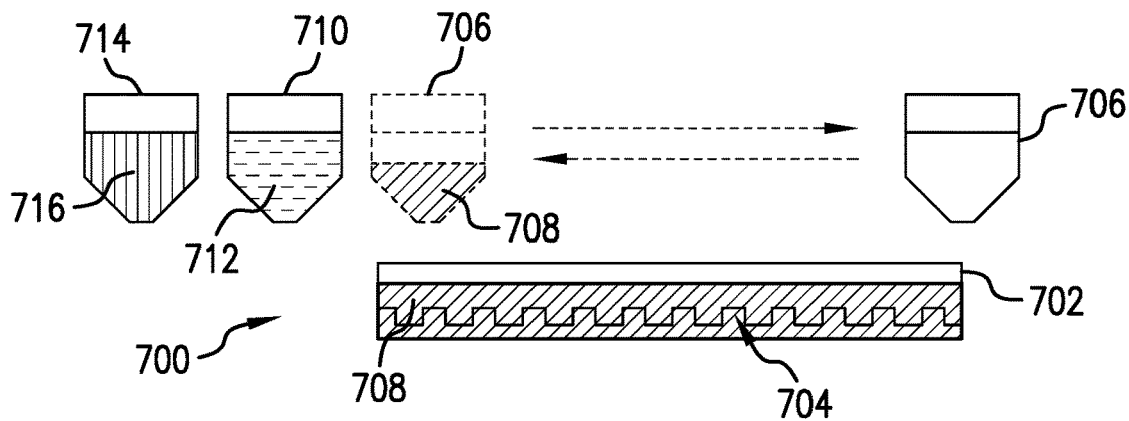
FIG. 7B is a schematic illustration of another step of the panel manufacturing process of FIG. 7A.
Figure 7C:
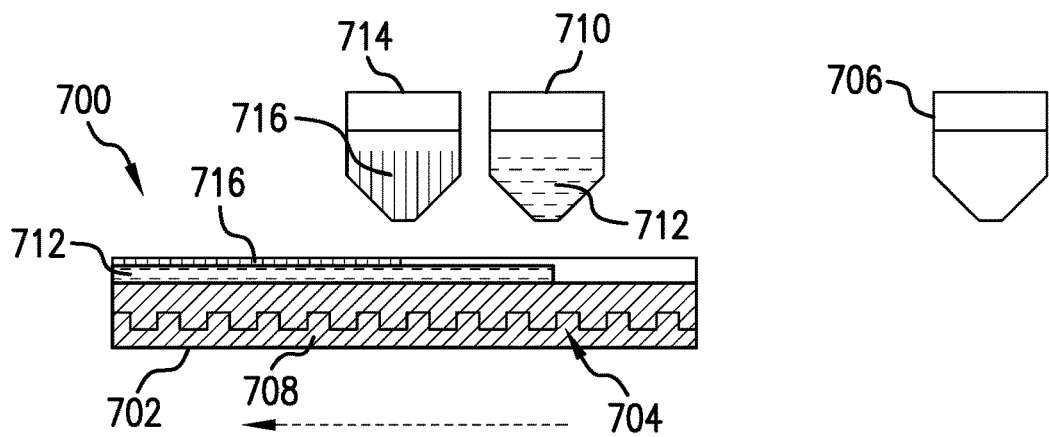
FIG. 7C is a schematic illustration of another step of the panel manufacturing process of FIG. 7A.

Turning now to FIGS. 7A-7C, schematic illustrations of a manufacturing system 700 for forming a panel in accordance with an embodiment of the present disclosure are shown. The manufacturing system 700 includes a mold 702 that is preconfigured to define a negative space to be filled with material to be molded into a panel of a mat. The mold 702 may include an interior pattern structure 704 that may be arranged to define internal structures or features to be formed in the final panel (or subsequently formed mat). As shown in FIG. 7A, a first hopper 706 is provided having a first material 708 held therein. A second hopper 710 contains a second material 712 and a third hopper 714 contains a third material 716. In some embodiments, each of the first material 708, the second material 712, and the third material 716 are different materials or materials that have different material properties. The materials may be resins (e.g., polyethylene, polypropylene, and/or other thermoplastic materials). The different materials 708, 712, 716 may be formed from different blends or compositions of different thermoplastic materials that are blended and selected to achieve a specific or predetermined material property (e.g., flexibility, stiffness, tread, wear resistance, heat resistance, etc., and/or combinations thereof). In some configurations, the first hopper 706 and the third hopper 714 may be filled with the same material, and the second hopper 710 includes a different material.

As shown in FIG. 7B, the first hopper 706 is moved transversely over the mold 702 such that the first material 708 may be deposited onto and into the mold 702 and the interior pattern structure 704. The first material 708 may be in solid pellet or granule form. In other embodiments, the first material 708 may be a liquid deposited into the mold 702 and the interior pattern structure 704. After the deposition of the first material 708 onto and in the mold 702, the mold 702 may be moved relative the second hopper 710 and the third hopper 714. For example, as shown in FIG. 7C, the mold 702 is moved such that the second material 712 may be deposited on top of the first material 708 from the second hopper 710 and the third material 716 may be deposited on top of the second material 712 from the third hopper 714. Each deposition of material may be across the whole mold (e.g., to form a portion of a panel in a layer form). In some embodiments, the mold may be arranged with dividers or the like to separate different sections to enable formation of panels similar to that shown in FIGS. 5-6.

After the three materials 708, 712, 716, in this example, are deposited into the mold 702, the filled mold may be pressure and heat treated to cause the materials to fuse together into a single, unitary, and continuous body of a panel. As a result, a formed panel will have a unitary structure with different portions or regions having different material properties due to the different materials 708, 712, 716 deposited into and on the mold 702.

Although shown and described above with the use of two or three different materials or portions, it will be appreciated that any number of different materials and/or portions may be defined within a single panel without departing from the scope of the present disclosure. Further, although FIGS. 7A-7C are an example manufacturing process that uses a mold and treatment thereof, such manufacturing process is not to be limiting. For example, in some embodiments, the panels may be formed with the different materials by an additive manufacturing process. In some embodiments, with two different portions, for example, only two hoppers may be used. Further, in embodiments where a first and third portion are formed of a single material and a second portion arranged therebetween has a different material, only two hoppers may be necessary.

After manufacturing of individual panels, having specific portions formed from different materials, two such panels may be arranged and joined to form a mat.

Figure 8:
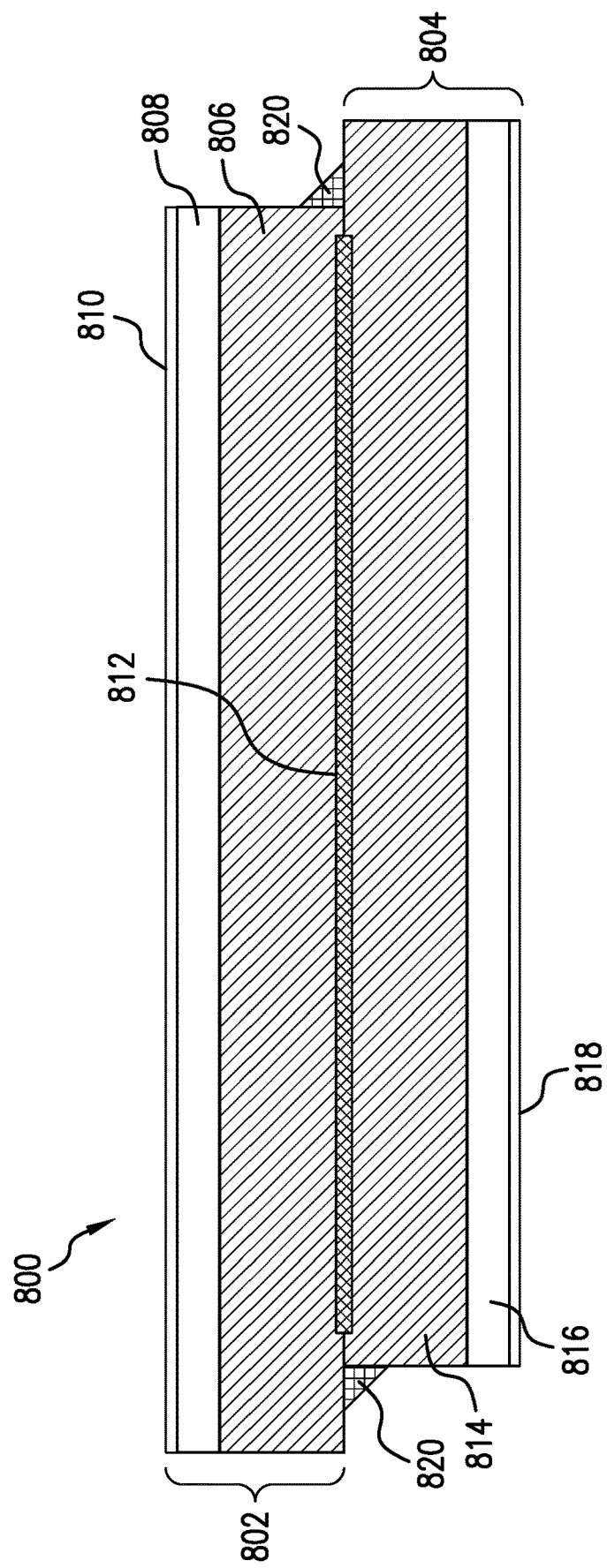
FIG. 8 is a side sectional illustration of a mat in accordance with an embodiment of the present disclosure.

For example, referring to FIG. 8, a schematic illustration of a mat 800 in accordance with an embodiment of the present disclosure is shown. The mat 800 is formed of two panels 802, 804 that are joined together. In this embodiment, the first panel 802 has a respective first portion 806, a respective second portion 808, and a respective third portion 810, arranged as layers, for example, similar to that shown and described with respect to FIG. 4. The first portion 806 and, in some embodiments, the second portion 808 define an interior support structure, such as shown and described above. Each of the first portion 806, the second portion 808, and the third portion 810 of the first panel may be formed from different materials and/or have different material properties. In an embodiment, the first portion 806 can comprise high density polyethylene, the second portion 808 can comprise a blend of high density and linear low-density polyethylene, and the third portion 810 can comprise a very low-density polyethylene bled with an antistatic agent.

The mat 800 includes the second panel 804 joined or bonded to the first panel 802 along a joint 812. The second panel 804 has a respective first portion 814, a respective second portion 816, and a respective third portion 818, arranged as layers, for example, similar to that shown and described with respect to FIG. 4. The first portion 814 and, in some embodiments, the second portion 816 define an interior support structure, such as shown and described above. Each of the first portion 814, the second portion 816, and the third portion 818 of the first panel may be formed from different materials and/or have different material properties. In an embodiment, the first portion 814 can comprises high density polyethylene, the second portion 816 can comprise a blend of high density and linear low-density polyethylene, and the third portion 818 can comprise a very low-density polyethylene blend with an antistatic agent. The joint 812 may be bonded material of each first portion 806, 814 of the first and second panels 802, 804. Additionally, a perimeter weld 820 may be added via an extruder using material similar to the first portions 806, 814 of the first and second panels 802, 804, or may be of a different material selected to bond the two panels 802, 804 together.

In this embodiment, the first and second panels 802, 804 of the mat 800 are substantially the same or symmetrical. That is, starting from the joint 814 and moving outward to external surfaces from a plane defined by the joint, the material and/or material properties will be the same through the thickness of each first portion 806, 814, change to the material/material properties of the second portions 808, 816, and then change to the material/material properties of the third portions 810, 818.

Figure 9A:
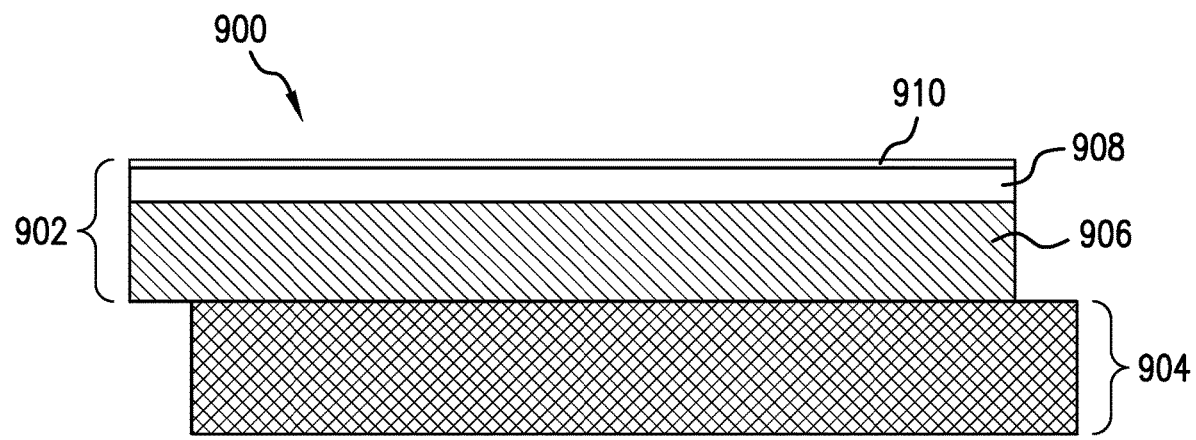
FIG. 9A is a side sectional illustration of a mat in accordance with an embodiment of the present disclosure.
Figure 9B:
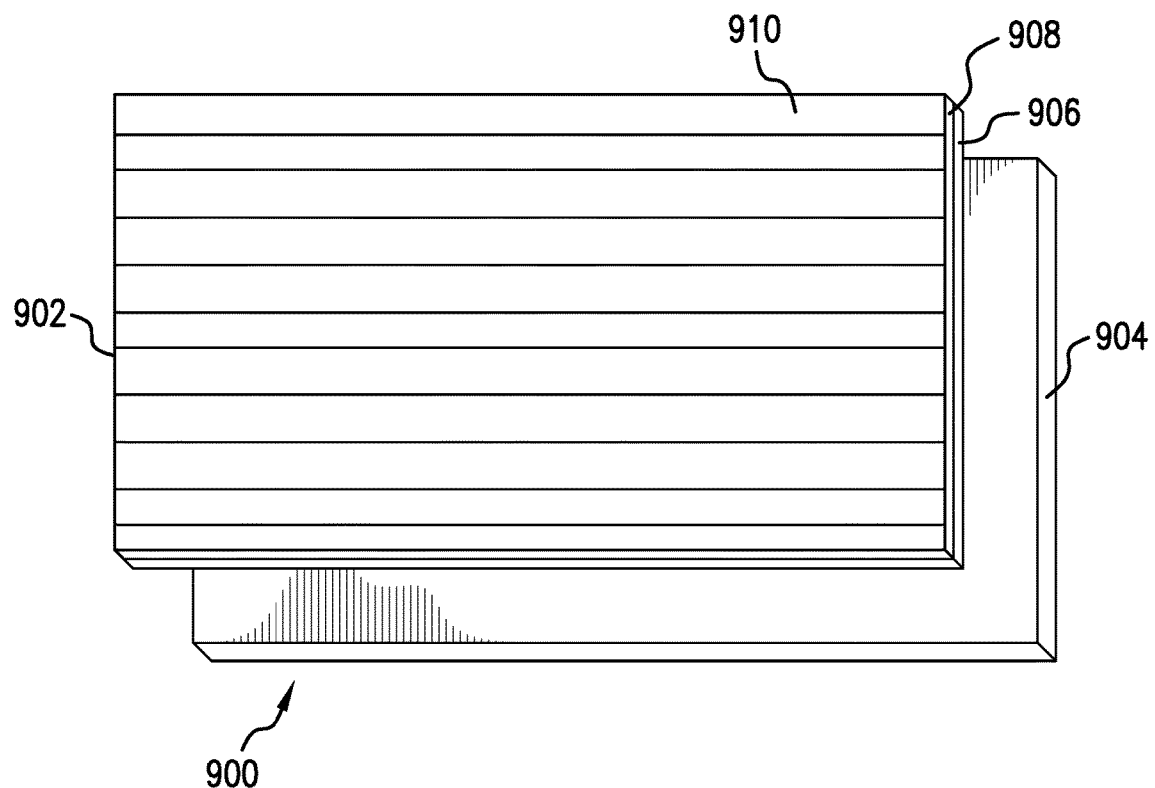
FIG. 9B is a top-down illustration of the mat of FIG. 9A.

Referring now to FIGS. 9A-9B, schematic illustrations of a mat 900 in accordance with an embodiment of the present disclosure are shown. The mat 900 is formed of two panels 902, 904 that are joined together. In this embodiment, the first panel 902 has a respective first portion 906, a respective second portion 908, and a respective third portion 910, arranged as layers, for example, similar to that shown and described with respect to FIG. 4. The first portion 906 and, in some embodiments, the second portion 908 define an interior support structure, such as shown and described above. Each of the first portion 906, the second portion 908, and the third portion 910 of the first panel may be formed from different materials and/or have different material properties.

The mat 900 includes the second panel 904 joined or bonded to the first panel 902 along a joint. The second panel 904, in this embodiment, is a homogenous panel, meaning that the entire second panel 904 is formed form a single material. The joint between the first panel 902 and the second panel 904 may be bonded material of each respective panel 902, 904. Additionally, similar to that described above, a perimeter weld may be added via an extruder using material similar to the first portion 906 of the first panel and/or the second panel 904 or may be of a different material selected to bond the two panels 902, 904 together.

In this embodiment, the first panel 902 and the second panel 904 of the mat 900 are, at least, compositionally different or asymmetrical. In some embodiments, the first panel 902 and the second panel 904 may also be structurally different, such as having different interior structure features and/or external features. In one non-limiting example, the first panel 902 may be arranged as a top panel for defining a surface upon which equipment may be placed or moved across and the second panel 904 may be arranged as a bottom panel for contact with the ground or other surface. The first panel 902 may include coloring and texture for the top surface and the second panel 904 may include increased crush resistance and environmental wear resistance, for example.

Figure 10:
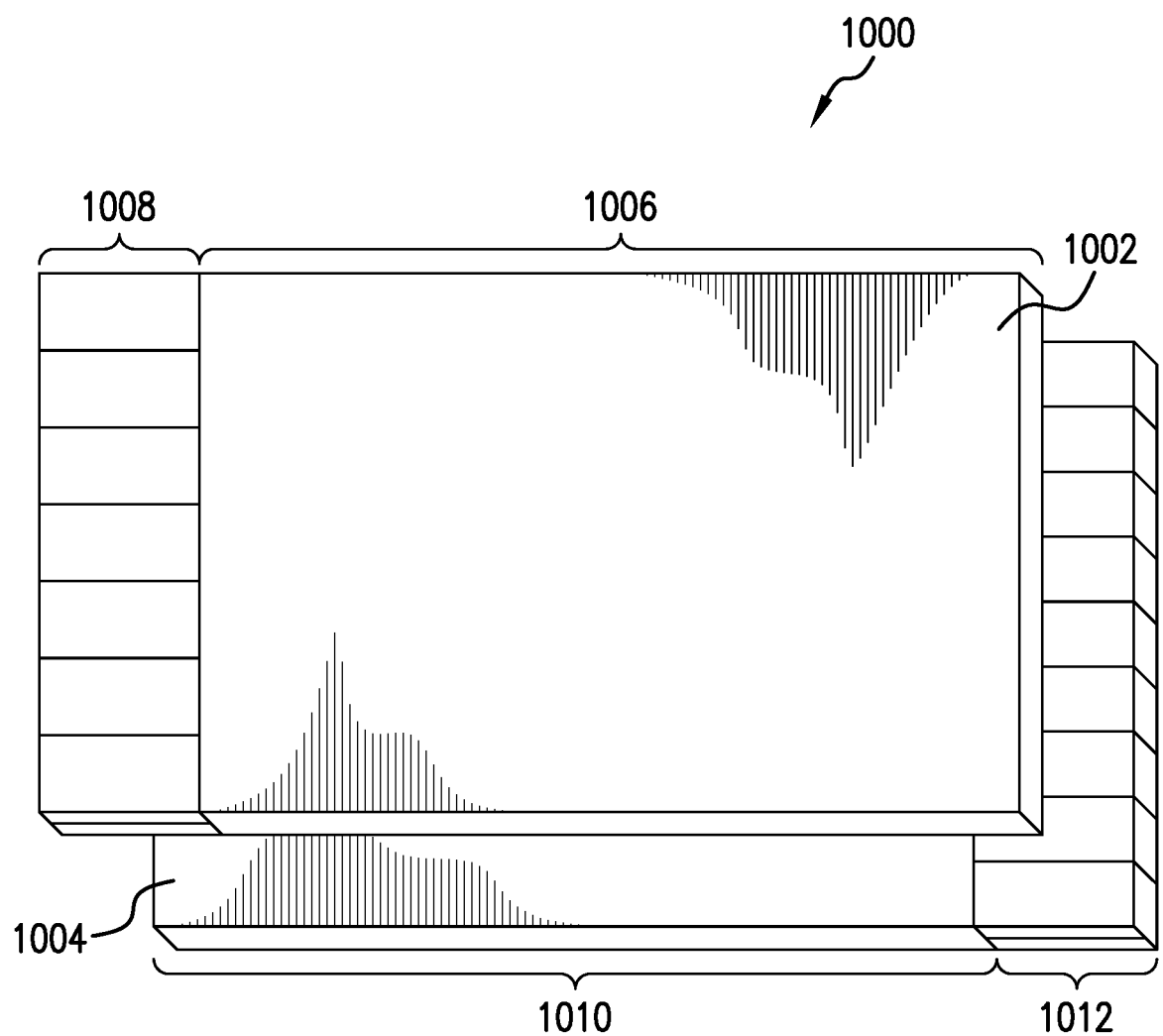
FIG. 10 is a schematic illustration of a mat in accordance with an embodiment of the present disclosure.

Referring to FIG. 10, a schematic illustration of a mat 1000 in accordance with an embodiment of the present disclosure is shown. The mat 1000 is formed of two panels 1002, 1004 that are joined together. In this embodiment, the first panel 1002 has a respective first portion 1006 and a respective second portion 1008 arranged adjacent to each other, for example, similar to that shown and described with respect to FIG. 5. The first portion 1006 may define an interior support structure, such as shown and described above, and the second portion 1008 may define a lip structure at an edge of the first panel 1002. Each of the first portion 1006 and the second portion 1008 may be formed from different materials and/or have different material properties. Similarly, the second panel 1004 has a respective first portion 1010 and a respective second portion 1012 arranged adjacent to each other, with the first portion 1010 and the second portion 1012 formed from different materials or material compositions.

As described herein, multiple different materials or compositions may be employed to form mats, panels, and/or portions thereof. As discussed above, different materials may be employed or different blends and compositions may be employed to achieve a desired material property within a given layer or portion of a formed structure.

For example, and without limitation, in a three-portion structure having three portions with different material compositions may include a first material composed of high density polyethylene ("HDPE") having a weight percentage between 75% and 90%, calcium carbonate concentrate having a weight percentage between 8% and 20%, and color concentrate having a weight percent between 0% and 5%, a second material composed of a similar composition, but may include recycled materials, and a third material composed of 60-75 wt % very low-density polyethylene ("VLDPE"), 15-25 wt % HDPE, 5-15 wt % anti-static agent, and 0-5 wt % color concentrate. In another example, the third material may be composed of 60-75 wt % metallocene linear low-density polyethylene ("mLLDPE"), 15-25 wt % HDPE, 5-15 wt % anti-static concentrate, and 0-5 wt % color concentrate.

In another three-portion structure having three portions with different material compositions, for example, a first material composed of 75-90 wt % HDPE %, 8-20 wt % calcium carbonate concentrate, and 0-5 wt % color concentrate, a second material having 50-60 wt % HDPE, 25-35 wt % linear low-density polyethylene ("LLDPE"), 8-20 wt % calcium carbonate concentrate, and 0-5 wt % color concentrate, and a third material composed of 60-75 wt % VLDPE, 15-25 wt % HDPE, 5-15 wt % anti-static agent, and 0-5% wt % color concentrate. In another embodiment, the second material may be composed of 50-60 wt % HDPE, 25-35 wt % Ziegler-Natta linear low-density polyethylene ("ZN-LLDPE"), 8-20 wt % calcium carbonate concentrate, and 0-5 wt % color concentrate, and the third material may be composed of 60-75 wt % mLLDPE, 15-25 wt % HDPE, 5-15 wt % anti-static agent, and 0-5% wt % color concentrate. In another embodiment, the second material may be composed of 50-60 wt % HDPE, 25-35 wt % mLLDPE, 8-20 wt % calcium carbonate concentrate, and 0-5 wt % color concentrate, and the third material may be composed of 60-75 wt % mLLDPE, 15-25 wt % HDPE, 5-15 wt % anti-static agent, and 0-5% wt % color concentrate.

In another three-portion structure having three portions with different material compositions, for example, a first material composed of 50-60 wt % HDPE %, 25-35 wt % LLDPE, 8-20 wt % calcium carbonate concentrate, and 0-5 wt % color concentrate, a second material having 50-60 wt % HDPE %, 25-35 wt % LLDPE, 8-20 wt % calcium carbonate concentrate, and 0-5 wt % color concentrate, and a third material composed of 60-75 wt % VLDPE, 15-25 wt % HDPE, 5-15 wt % anti-static agent, and 0-5% wt % color concentrate.

In another three-portion structure having three portions with different material compositions, for example, a first material composed of 50-60 wt % HDPE %, 25-35 wt % ZN-LLDPE, 8-20 wt % calcium carbonate concentrate, and 0-5 wt % color concentrate, a second material having 50-60 wt % HDPE %, 25-35 wt % mLLDPE, 8-20 wt % calcium carbonate concentrate, and 0-5 wt % color concentrate, and a third material composed of 60-75 wt % mLLDPE, 15-25 wt % HDPE, 5-15 wt % anti-static agent, and 0-5% wt % color concentrate.

Although the above examples are provided, those of skill in the art will appreciate that other materials, compositions, and/or blends may be employed without departing from the scope of the present disclosure. That is, the above examples are merely for explanatory and illustrative purposes and are not intended to be limiting on the scope of the present application.

Advantageously, embodiments of the present disclosure provide for improved panels and panels for mats used to form support surfaces. The panels may be formed with two or more portions, with each portion having a different property, thus providing for customized and specific properties of the panels at specific locations or regions. Resulting mats may be highly customized and designed for particular tasks or purposes.

As used herein, the terms "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A panel of a mat, the panel comprising:
a first portion defined by a first material, wherein the first material comprises at least 75% weight percent high density polyethylene ("HDPE"); and
a second portion defined by a second material, wherein the second material comprises a weight percent of high density polyethylene ("HDPE") that is equal to or less than that of the first material,
wherein the first material of the first portion and the second material of the second portion are melted and bonded together, and
wherein the first material and the second material have at least one of different compositions and different material properties.

2. The panel of claim 1, wherein the first material is different from the second material in at least two of density, flexibility, stiffness, rigidity, antiskid, antistatic, conductivity, resilience, chemical resistance, and permeability properties.

3. The panel of claim 1, wherein the first portion is a first layer and the second portion is a second layer adjacent to the first layer.

4. The panel of claim 3, wherein the first portion defines a top surface of the panel and the second portion defines a bottom surface of the panel.

5. The panel of claim 1, wherein the first portion extends from a bottom surface to a top surface of the panel and the second portion extends from the bottom surface to the top surface of the panel, wherein the first portion is adjacent the second portion.

6. The panel of claim 5, wherein the first portion defines a main body of the panel and the second portion defines a lip structure of the panel.

7. The panel of claim 1, further comprising a third portion arranged such that the second portion is positioned at least partially between the first portion and the third portion.

8. The panel of claim 7, wherein the third portion is formed by the first material.

9. The panel of claim 1, wherein at least the first portion defines interior structures comprising a combination of voids and ribs of the panel.

10. The panel of claim 1, wherein the first material and the second material are directly bonded and fused together to form a single, unitary, continuous body.

11. The panel of claim 1, wherein the first material is composed of high density polyethylene ("HDPE") having a weight percentage between 75% and 90%, calcium carbonate concentrate having a weight percentage between 8% and 20%, and a color concentrate having a weight percent between 0% and 5%.

12. The panel of claim 11, wherein the second material is composed of 50-60 weight percentage high density polyethylene ("HDPE"), 25-35 weight percentage linear low-density polyethylene ("LLDPE"), 8-20 weight percentage calcium carbonate concentrate, and 0-5 weight percentage color concentrate.

13. The panel of claim 7, wherein:
the first material comprises high density polyethylene ("HDPE") having a weight percentage between 75% and 90%, calcium carbonate concentrate having a weight percentage between 8% and 20%, and color concentrate having a weight percent between 0% and 5%,
the second material comprises a similar composition as the first material and includes recycled materials, and
the third portion is formed of a third material comprising 60-75 weight percent very low-density polyethylene ("VLDPE"), 15-25 weight percent HDPE, 5-15 weight percent anti-static agent, and 0-5 color concentrate.

14. The panel of claim 7, wherein:
the first material comprises high density polyethylene ("HDPE") having a weight percentage between 75% and 90%, calcium carbonate concentrate having a weight percentage between 8% and 20%, and color concentrate having a weight percent between 0% and 5%,
the second material comprises a similar composition as the first material and includes recycled materials, and
the third portion is formed of a third material comprising 60-75 weight percentage metallocene linear low-density polyethylene ("mLLDPE"), 15-25 weight percentage HDPE, 5-15 weight percentage anti-static concentrate, and 0-5 weight percentage color concentrate.

15. The panel of claim 7, wherein:
the first material comprises of 75-90 weight percentage high density polyethylene ("HDPE"), 8-20 calcium carbonate concentrate, and 0-5 weight percentage color concentrate,
the second material comprises 50-60 weight percentage high density polyethylene ("HDPE"), 25-35 weight percentage linear low-density polyethylene ("LLDPE"), 8-20 weight percentage calcium carbonate concentrate, and 0-5 weight percentage color concentrate, and
the third portion is formed of a third material comprising 60-75 weight percentage very low-density polyethylene ("VLDPE"), 15-25 weight percentage high density polyethylene ("HDPE"), 5-15 weight percentage anti-static agent, and 0-5% weight percentage color concentrate.

16. A mat comprising:
a first panel; and
a second panel bonded to the first panel, wherein the first panel comprises:
a respective first portion defined by a respective first material; and
a respective second portion defined by a respective second material,
wherein the respective first material and the respective second material have at least one of different compositions and different material properties, and
wherein at least a part of the second portion defines a lip structure of the mat that extends from the first portion and does not overlap with the second panel
wherein the first material comprises high density polyethylene ("HDPE") having a weight percentage between 75% and 90% and calcium carbonate concentrate having a weight percentage between 8% and 20%.

17. The mat of claim 16, wherein the second panel comprises:
a respective first portion defined by a respective first material; and
a respective second portion defined by a respective second material,
wherein the respective first material of the second panel and the respective second material of the second panel have at least one of different compositions and different material properties.

18. The mat of claim 16, wherein the second panel is formed from a single material.

19. The mat of claim 17, further comprising a joint between the first panel and the second panel, wherein the joint comprises bonded material of the first material of the first portion of the first panel and the first material of the first portion of the second panel.

20. The mat of claim 16, further comprising a perimeter weld that bonds the first panel to the second panel.

* * * * *